United States Patent
Abruña et al.

(10) Patent No.: US 9,748,568 B2
(45) Date of Patent: Aug. 29, 2017

(54) MANGANESE OXIDE NANOPARTICLES, METHODS AND APPLICATIONS

(75) Inventors: Héctor D. Abruña, Ithaca, NY (US); Jie Gao, Ithaca, NY (US); Michael A. Lowe, Ithaca, NY (US)

(73) Assignee: CORNELL UNIVERSITY, Ithaca, NY (US)

(*) Notice: Subject to any disclaimer, the term of this patent is extended or adjusted under 35 U.S.C. 154(b) by 44 days.

(21) Appl. No.: 14/122,346

(22) PCT Filed: Jun. 1, 2012

(86) PCT No.: PCT/US2012/040360
§ 371 (c)(1),
(2), (4) Date: Jan. 29, 2014

(87) PCT Pub. No.: WO2012/167010
PCT Pub. Date: Dec. 6, 2012

(65) Prior Publication Data
US 2014/0134493 A1 May 15, 2014

Related U.S. Application Data

(60) Provisional application No. 61/492,661, filed on Jun. 2, 2011.

(51) Int. Cl.
*H01M 4/50* (2010.01)
*H01M 4/505* (2010.01)
(Continued)

(52) U.S. Cl.
CPC ............ *H01M 4/505* (2013.01); *B82Y 30/00* (2013.01); *B82Y 40/00* (2013.01); *C01G 45/02* (2013.01);
(Continued)

(58) Field of Classification Search
CPC .. C01G 45/02; C01P 2002/72; C01P 2004/03; C01P 2004/64; Y10T 428/2982;
(Continued)

(56) References Cited

U.S. PATENT DOCUMENTS 5,116,542 A 5/1992 Ochi et al.
5,601,952 A 2/1997 Dasgupta et al.
(Continued)

FOREIGN PATENT DOCUMENTS

CN 101494284 A 7/2009
CN 101803075 8/2010
(Continued)

OTHER PUBLICATIONS

Yan Yu, Chunhua Chen, Chunlei Wang, ISNEPP 2007 International Symposium on Nanotechnology in Environmental Protection and Pollution, Dec. 13, 2007, www.isnepp.org/ISNEPP07/Program_Abstracts_Online.pdf.
(Continued)

*Primary Examiner* — Brittany Raymond
(74) *Attorney, Agent, or Firm* — Bond, Schoeneck & King, PLLC; William Greener; Alek Szecsy

(57) ABSTRACT

Manganese oxide nanoparticles having a chemical composition that includes $Mn_3O_4$, a sponge like morphology and a particle size from about 65 to about 95 nanometers may be formed by calcining a manganese hydroxide material at a temperature from about 200 to about 400 degrees centigrade for a time period from about 1 to about 20 hours in an oxygen containing environment. The particular manganese oxide nanoparticles with the foregoing physical features may be used within a battery component, and in particular an anode within a lithium battery to provide enhanced performance.

22 Claims, 9 Drawing Sheets

(51) Int. Cl.
 C01G 45/02 (2006.01)
 B82Y 30/00 (2011.01)
 B82Y 40/00 (2011.01)
(52) U.S. Cl.
 CPC ........... *H01M 4/50* (2013.01); *C01P 2002/72* (2013.01); *C01P 2004/03* (2013.01); *C01P 2004/64* (2013.01); *Y10T 428/2982* (2015.01)
(58) Field of Classification Search
 CPC .......... B82Y 40/00; B82Y 30/00; H01M 4/50; H01M 4/505
 See application file for complete search history.

(56) References Cited

U.S. PATENT DOCUMENTS

| | | | |
|---|---|---|---|
| 5,807,646 | A | 9/1998 | Iwata et al. |
| 5,985,237 | A | 11/1999 | Lu et al. |
| 5,997,839 | A | 12/1999 | Pillai |
| 6,048,645 | A | 4/2000 | Saidi |
| 6,423,294 | B2 | 7/2002 | Manev |
| 6,607,706 | B1 * | 8/2003 | Kumar et al. ............... 423/599 |
| 6,960,335 | B1 | 11/2005 | Singhal et al. |
| 7,323,158 | B2 | 1/2008 | Kumar et al. |
| 8,168,326 | B2 | 5/2012 | Chiang et al. |
| 8,304,115 | B1 * | 11/2012 | Petkov et al. ............... 429/304 |
| 2002/0122767 | A1 * | 9/2002 | Takahashi ..................... 423/593 |
| 2007/0111098 | A1 | 5/2007 | Yang Kook et al. |
| 2007/0173402 | A1 | 7/2007 | Prochazka et al. |
| 2010/0243459 | A1 | 9/2010 | Friesen et al. |
| 2010/0305378 | A1 | 12/2010 | Galloway et al. |
| 2011/0037440 | A1 | 2/2011 | Endo et al. |
| 2012/0077095 | A1 | 3/2012 | Roumi et al. |
| 2013/0273402 | A1 * | 10/2013 | Tsutsumi et al. ............... 429/99 |

FOREIGN PATENT DOCUMENTS

| | | |
|---|---|---|
| KR | 100266074 B1 | 9/2000 |
| WO | 0027754 A1 | 5/2000 |
| WO | 2009010895 | 1/2009 |

OTHER PUBLICATIONS

Jie Gao et al., Spongelike Nanosized Mn3O4 as a High-Capacity Anode Material for Rechargeable Lithium Batteries, Chem. Mater. 2011, 23, 3223-3227, Z—Inventor Article http://wenku.baidu.com/view/df48561fff00bed5b9f31d9d.html.

Haisheng et al., Reality and Future of Rechargeable Lithium Batteries, The Open Materials Science Journal, 2011, 5 (Suppl 1: M2) 204-214, http://benthamscience.com/open/tomsj/articles/V005/SI0203TOMSJ/204TOMSJ.pdf.

Yan, D., Nanoparticles and 3D sponge-like porous networks of manganese oxides and their microwave absorption properties, Dec. 17, 2009, http://iopscience.iop.org/0957-4484/20/10/105706;jsessionid=C33B383E5DAC82009BCE6CF6580196C5.c2.

Suo Liumin, et al., Preparation and Effects of Nanometer Mn3O4 by Oxidation Precipitation Method, Micronanoelectronic Technology, vol. 46, No. 1:23-28, Jan. 31, 2009.

* cited by examiner (a)

(b)

MANGANESE OXIDE NANOPARTICLES, METHODS AND APPLICATIONS

CROSS-REFERENCE TO RELATED APPLICATION

This application is related to, and derives priority from, U.S. Provisional Patent Application Ser. No. 61/492,661, filed 2 Jun. 2011 and titled Manganese Oxide Materials, Methods and Applications, the contents of which are incorporated herein fully by reference.

STATEMENT OF GOVERNMENT INTEREST

The investigations that lead to the embodiments described herein and the invention claimed herein were funded by the United States Department of Energy under project number DE-SC0001086. The United States Government has rights in the invention claimed herein.

BACKGROUND

Field of the Invention

Embodiments relate generally to metal oxide nanoparticles, methods and applications. More particularly, embodiments relate to enhanced performance metal oxide nanoparticles, methods and applications.

Description of the Related Art

Rechargeable lithium batteries have revolutionized portable electronic devices. They are also increasingly being pursued for electric and hybrid electric vehicle power supply applications. However, a major concern regarding rechargeable lithium batteries is safety, in particular when metallic lithium serves as an anode material within a rechargeable lithium battery. Such safety concerns arise from the gradual formation of lithium dendrites which may pierce a separator that separates an anode and a cathode within a cell within a rechargeable lithium battery and lead to a short circuiting of the cell.

Given the clear commercial significance of lithium batteries, desirable are additional materials and methods that may provide for safer and more efficient lithium batteries and lithium battery components.

SUMMARY

Embodiments include manganese oxide nanoparticles, methods for preparing the manganese oxide nanoparticles and lithium battery applications of the manganese oxide nanoparticles. The manganese oxide nanoparticles, methods for preparing the manganese oxide nanoparticles and the lithium battery applications of the manganese oxide nanoparticles may be directed towards the stoichiometric manganese oxides $Mn_3O_4$ and $Mn_2O_3 \cdot MnO$, as well as non-stoichiometric manganese oxides, and also the lithiated manganese oxides $Li_xMn_3O_4$ (x≥0).

In particular, the embodiments provide a particular manganese oxide nanoparticle having particular physical properties that result from a particular method for preparing the manganese oxide nanoparticle. The particular physical properties include a sponge like morphology (i.e., when imaged using scanning electron microscopy at a magnification of 2000) and a particle size in a range from about 65 to about 95 nanometers. The manganese oxide nanoparticle may comprise an anode material for a rechargeable lithium battery.

The method for preparing the manganese oxide nanoparticle in accordance with the embodiments is simple and involves only inexpensive and readily available raw materials with no need for special equipment. More importantly, an anode electrode for use within a lithium battery (i.e., a lithium ion battery) in accordance with the embodiments that comprises the manganese oxide nanoparticle in accordance with the embodiments not only provides a high initial reversible capacity (869 mAh/g), a high stabilized reversible capacity (800 mAh/g) and a high coulomb efficiency (65%), but also demonstrates very good cycling performance. Within the context of the embodiments, "very good" cycling performance is intended as cycling performance where at least about 90% of an initial charge value is retained after 40 battery charge and discharge cycles while using an anode electrode comprising the manganese oxide nanoparticle in accordance with the embodiments.

The embodiments also provide an anode material for rechargeable lithium batteries with improved safety performance and a more attractive operating voltage. A relithiation voltage of manganese oxide in the form of $Mn_3O_4$ (~0.6 V) is higher than that of typical graphitic carbon (below 0.2 V). This feature of a manganese oxide nanoparticle in accordance with the embodiments essentially precludes lithium deposition. Manganese oxide in the form of $Mn_3O_4$ also possesses lower operating voltages (average potentials ~1.3 V on delithiation, 0.6 V on lithiation) than $Co_3O_4$ (2.1 V on delithiation, 1.2 V on lithiation). Thus, when combined with a specific cathode, the full-cell operating voltage and consequently the energy density will be higher for a lithium battery that includes a manganese oxide anode in the form of $Mn_3O_4$ in comparison, for example, with a cobalt oxide anode in the form of $Co_3O_4$.

These and other features and advantages of the embodiments will become more readily apparent to those skilled in the art upon consideration of the following detailed description and accompanying drawings which describe the embodiments.

A particular manganese oxide nanoparticle in accordance with the embodiments includes a nanoparticle comprising a manganese oxide material and having a particle size from about 65 to about 95 nanometers.

A particular battery component in accordance with the embodiments includes a nanoparticle comprising a manganese oxide material having a particle size from about 65 to about 95 nanometers.

A particular battery in accordance with the embodiments includes a battery component comprising a nanoparticle comprising a manganese oxide material having a particle size from about 65 to about 95 nanometers.

A particular method for preparing a nanoparticle in accordance with the embodiments includes calcining a manganese hydroxide material to form a manganese oxide nanoparticle material having a particle size from about 65 to about 95 nanometers.

BRIEF DESCRIPTION OF THE DRAWINGS

The following drawings form part of the present specification and are included to demonstrate, further, certain aspects of the present embodiments. The embodiments may be better understood by reference to one or more of these drawings in combination with the detailed description of specific embodiments presented herein below.

DETAILED DESCRIPTION OF THE EMBODIMENTS

Figure 1:
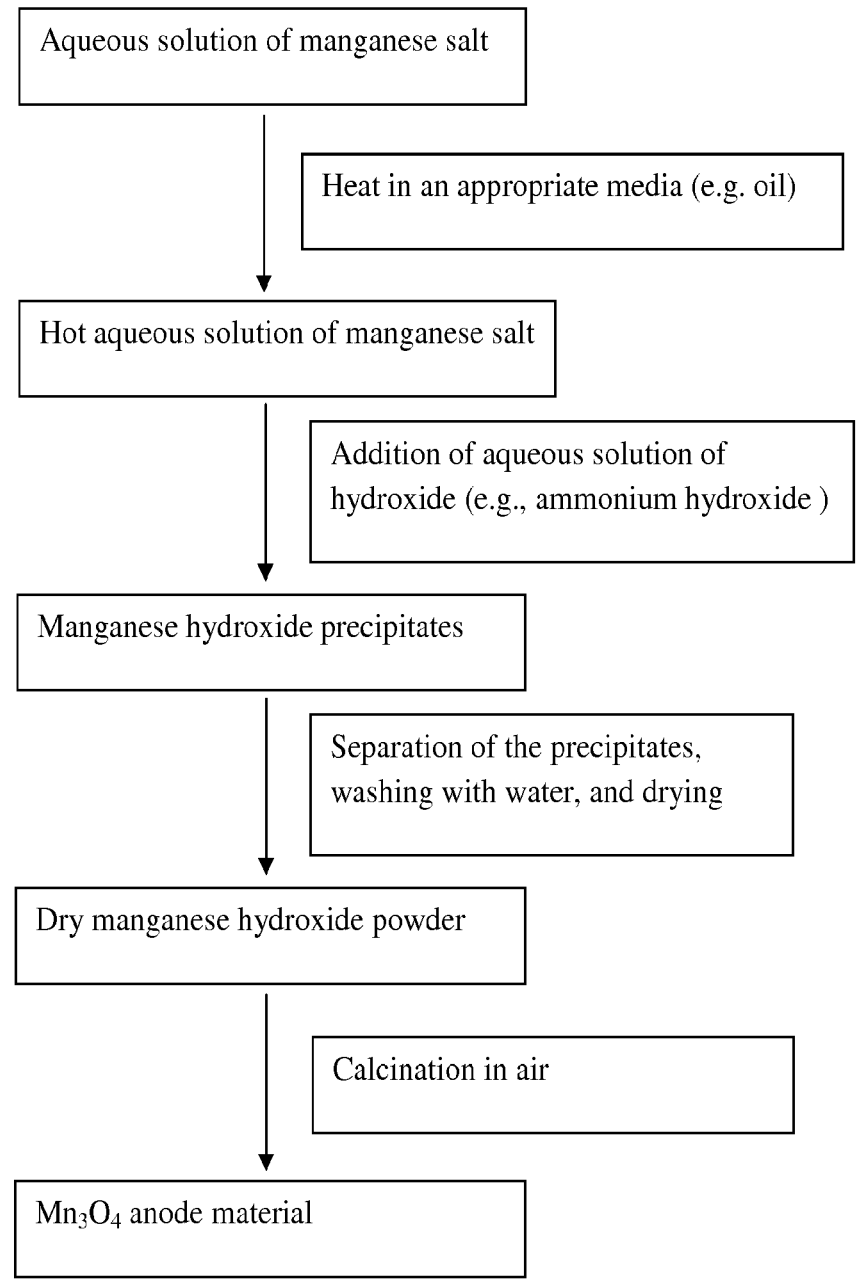
FIG. 1 shows a flow chart diagram illustrating a process sequence for preparing a manganese oxide ($Mn_3O_4$) nanoparticle powder in accordance with the embodiments.

The embodiments provide a manganese oxide nanoparticle, a method for preparing the manganese oxide nanoparticle and related battery applications of the manganese oxide nanoparticle. The particular battery applications of the manganese oxide nanoparticle in accordance with the embodiments are a negative electrode (anode) in a rechargeable lithium battery, such as but not limited to a rechargeable lithium ion battery. The particular method for preparing the manganese oxide nanoparticle provides the particular manganese oxide nanoparticle with particular structural characteristics that are desirable within the particular related battery applications of the manganese oxide nanoparticle.

It will be understood that various changes or modifications on the materials and methods as described as follows are contemplated and may be made without departing from the spirit of the embodiments. The following detailed description of the embodiments, therefore, is not to be taken in a limiting sense. Rather, the embodiments as described below are intended as illustrative and non-limiting.

As indicated above, the embodiments relate to novel materials, and in particular manganese oxide nanoparticle materials, for use as anode materials within rechargeable lithium batteries. It will be understood that a cathode within a rechargeable lithium battery in accordance with the embodiments for use with an anode in accordance with the embodiments may be any lithium host cathode material, provided that the lithium host cathode material may provide a lithium ion when charging. Preferably, the cathode material will have a higher voltage vs. $Li^+$/Li, such as $LiCoO_2$, $LiMn_2O_4$, and $LiFePO_4$. Binders and other materials normally associated with both the electrolyte, and the anode and cathode, are well known and are not described herein, but are included as is understood by those skilled in this art.

The lithium battery anode in accordance with the embodiments preferably includes a manganese oxide nanoparticle material composition, and more specifically a stoichiometric manganese oxide nanoparticle material composition, of which both $Mn_3O_4$ and $Mn_2O_3$~MnO are representative. As well, the embodiments may also include lithiated manganese oxide nanoparticles $Li_xMn_3O_4$ (x≥0) and non-stoichiometric manganese oxide nanoparticles.

Nanosized transition metal oxides have been extensively studied to serve as promising lithium battery anode materials, most of which show much higher capacity than a graphite anode. It has been proposed that transition metal oxides react with lithium through a conversion reaction: $MO+2Li^++2e=Li_2O+M^0$. They often possess higher lithiation potentials than graphite, which tends to preclude metallic lithium deposition. Several transition metal oxides have been explored as lithium battery anodes, such as but not limited to NiO, CoO, and $Co_3O_4$ etc. Many reports have been focused on $Co_3O_4$. However, cobalt is generally economically unattractive and toxic.

In light of deficiencies with $Co_3O_4$ as a lithium battery anode material, the embodiments alternatively provide a manganese oxide nanoparticle material and a method for preparing the manganese oxide nanoparticle material (i.e., most commonly $Mn_3O_4$) with a distinct architecture. The embodied manganese oxide nanoparticle material, particularly in the $Mn_3O_4$ form, provides high capacity and high Coulomb efficiency, and more importantly provides very good cycle performance. The embodiments realize the foregoing result in absence of a graphene oxide composite base (or other conductive composite base material which may be less economical in comparison with a graphite material) with respect to a manganese oxide nanoparticle material. Thus, the embodiments realize an enhanced performance lithium battery in accordance with embodiments absent comparatively expensive materials, such as but not limited to graphene oxide materials.

A process sequence for preparing manganese oxide nanoparticle materials in the form of $Mn_3O_4$ is illustrated within the schematic process flow diagram of FIG. 1. As shown at left hand side, top process step, a manganese salt is used as the source of manganese to form an aqueous manganese salt solution. The manganese salt may include, but is not limited to, at least one of manganese nitrate ($Mn(NO_3)_2$), manganese sulfate ($MnSO_4$), manganese acetate ($Mn(COOCH_3)_2$) and manganese chloride ($MnCl_2$). A water-soluble manganese (II) salt is preferred. The concentration of the manganese salt is not limited, but preferably in a range from about 0.05 mol/L to its saturated limit.

As is illustrated within the right hand side, first process step and the left hand side, second process step, within the schematic process flow diagram of FIG. 1, the solution of manganese salt that will react with hydroxide in a following process step may be heated to a certain temperature while using an apparatus such as but not limited to an oil bath. This heating process step may not be necessary, but elevated temperatures typically provide shorter reaction times. Such an elevated temperature may range from about 20° C. to about 120° C.

As illustrated within the right hand side, second from top process step within the process flow schematic diagram of FIG. 1, to form precipitates of manganese hydroxide, a solution of a hydroxide is added to the manganese salt solution. The hydroxide solution may include, but is not necessarily limited to a lithium hydroxide (LiOH), a sodium hydroxide (NaOH), a potassium hydroxide (KOH), a calcium hydroxide ($Ca(OH)_2$) and an ammonium hydroxide ($NH_4OH$) solution. Ammonium hydroxide solutions are preferred since ammonium hydroxide does not introduce any cationic impurities in the ultimate product manganese oxide nanoparticle material. The concentration of the hydroxide solution may be varied. The overall amount of the hydroxide solution used may also be varied, but is preferably stoichiometric to the manganese in the manganese salt solution. After addition of the hydroxide solution, it is preferable to allow the hydroxide precipitating reaction in accordance with the left hand side, third from top process step within the schematic process flow diagram of FIG. 1 to proceed for some time, e.g. from about 10 min to about 10 hours.

As illustrated within the right hand side, third from top process step within the schematic process flow diagram of FIG. 1, the precipitates of manganese hydroxide may be collected from the reaction vessel by filtration or centrifugation. The precipitates collected are preferably washed with distilled or deionized water to remove any impurities. After washing, and as illustrated within the left hand side, fourth from top process step within the schematic process flow diagram of FIG. 1, the manganese hydroxide precipitates should be dried in an oven for about 5 hours to about 30 hours, to remove moisture. A vacuum oven is preferable to dry the manganese hydroxide precipitates more efficiently. The temperature to dry the manganese hydroxide precipitates is preferably from about 50° C. to about 150° C.

As illustrated within the right hand side, fourth from top process step within the schematic process flow diagram of FIG. 1, to form $Mn_3O_4$, the dried precipitates need to be calcined in a furnace in the presence of oxygen, desirably in air. The calcination temperature is desirably from about 200° C. to about 400° C. The calcination time can be from about 1 hour to about 20 hours depending on the calcination temperature. A preferable calcination condition is about 300° C. for about 5 hours. After calcination, the powder, more specifically $Mn_3O_4$, as is illustrated within the left hand side, last process step within the schematic process flow diagram of FIG. 1, can be used directly to prepare the electrode in accordance with the embodiments as described in subsequent examples.

Figure 2:
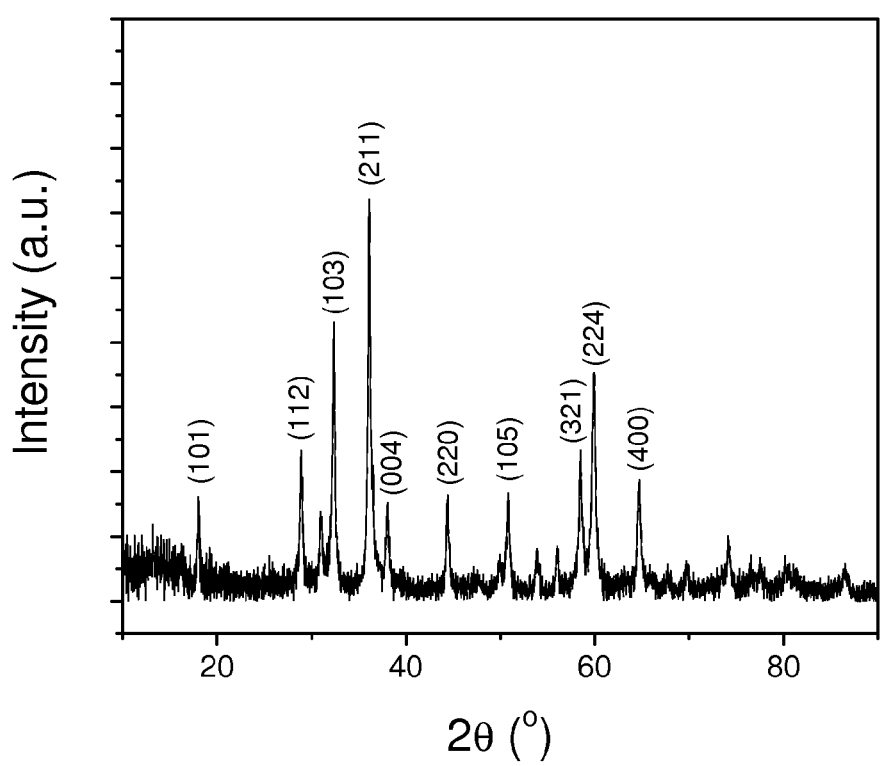
FIG. 2 shows an x-ray diffraction spectrum of a manganese oxide ($Mn_3O_4$) powder in accordance with the embodiments.

The manganese oxide obtained from the foregoing calcination process step is a pure phase material with a tetragonal spinel structure which can be indexed to $Mn_3O_4$ with space group I41/and (JCPDS card: 24-0734) as further characterized by x-ray diffraction as illustrated in FIG. 2. No impurities are generally detected. The width of diffraction peaks indicates a domain size of around 30 nm, as estimated from the Scherrer equation. As is understood by a person skilled in the art, the foregoing grain size of about 30 nanometers for a $Mn_3O_4$ nanoparticle in accordance with the embodiment differs from a particle size of a manganese oxide nanoparticle in accordance with the embodiments, as will be discussed further below in accordance with a description of FIG. 3, due to instrumental peak broadening and agglomeration of smaller sized primary domains into larger sized secondary particles.

Figure 3:
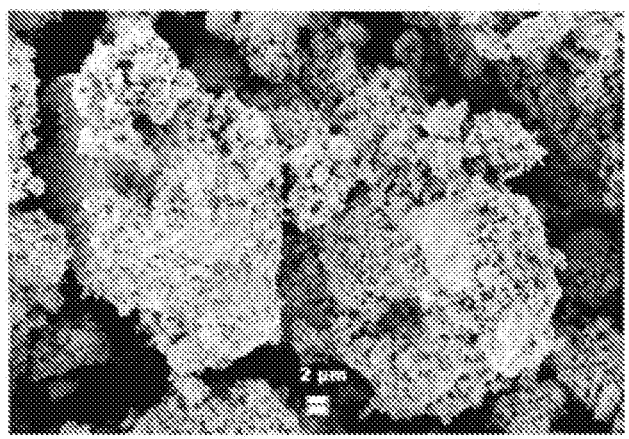
FIG. 3 shows a scanning electron microscopy (SEM) image of a sample of a manganese oxide ($Mn_3O_4$) powder in accordance with the embodiments.
Figure 3:
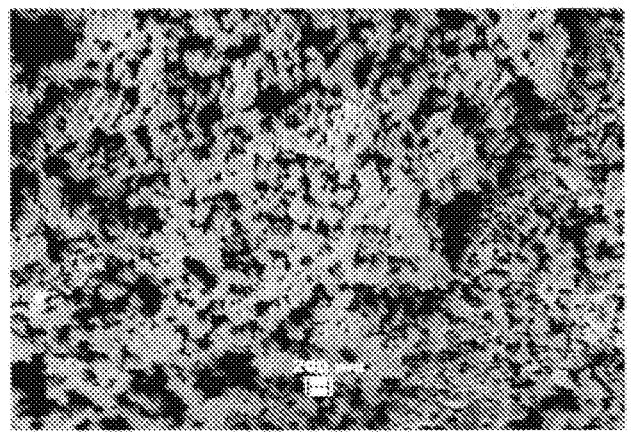

The manganese oxide, more specifically $Mn_3O_4$, obtained from the foregoing calcination has a particular sponge-like structure (i.e., within the context of scanning electron microscopy imaging) comprising and consisting of nano-sized particles. To that end, FIG. 3 shows scanning electron microscopy (SEM) images of a typical $Mn_3O_4$ sample with the sponge-like morphology and structure. Such a manganese oxide sample looks like a sponge under low magnification of 2000 times (see, e.g., FIG. 3a). At high magnification of 20000 times (see, e.g., FIG. 3b), it can be easily seen that the "sponge" consists of nanosized $Mn_3O_4$ particles, with an average size of about 80 nm and more generally in a range from about 65 to about 95 nanometers, and more particularly in a range from about 75 to about 85 nanometers.

Figure 4:
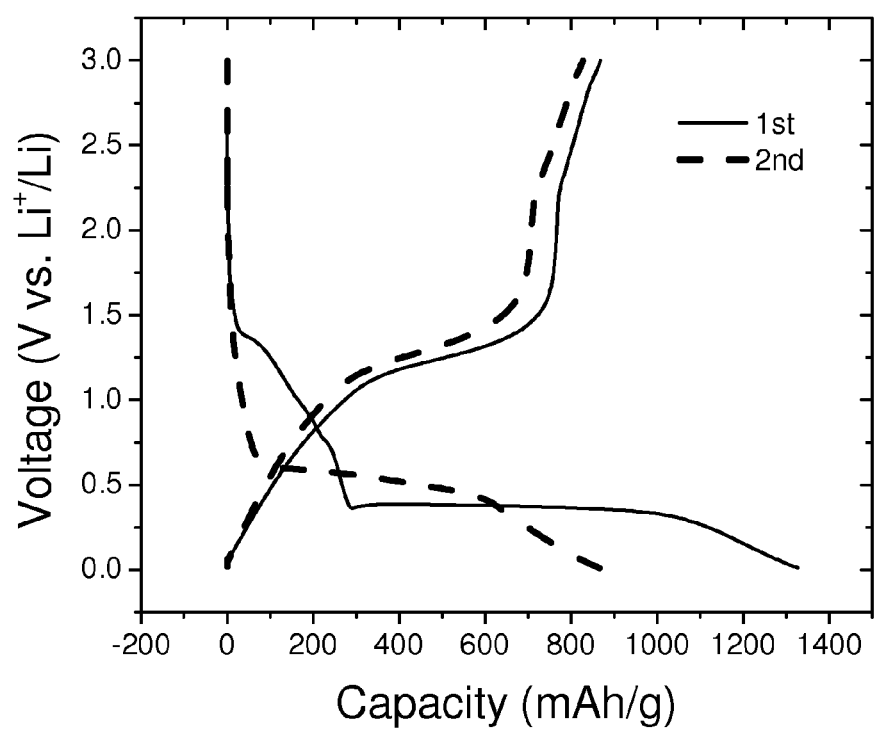
FIG. 4 shows the first and second discharge/charge curves of a $Mn_3O_4$/$LiPF_6$+EC+DEC/Li coin cell at a current rate of 0.25 C (1 C is defined as one lithium per formula in one hour, i.e. 117 mA/g for $Mn_3O_4$).

This $Mn_3O_4$ manganese oxide nanoparticle material provides very high reversible capacity when included within an anode within a lithium battery. FIG. 4 shows the first and second discharge-charge profiles of a battery electrode including the $Mn_3O_4$ manganese oxide at a current rate of 0.25 C (1 C is defined as one lithium per formula in one hour, i.e. 117 mA/g for said $Mn_3O_4$ manganese oxide nanoparticle material in 1.0 M $LiPF_6$ EC/DEC (1:1 by volume). With respect to FIG. 4 during the first discharge, a slope from 1.5 V to 0.38 V formed. This slope may be attributed to the formation of a solid-electrolyte interface (SEI) film. After that, a well defined voltage plateau around 0.38 V is observed, corresponding with the main reaction of lithium and $Mn_3O_4$. The overall discharge capacity reaches 1327 mAh/g. The first charge curve also shows a well defined voltage plateau around 1.3 V. The first charge capacity approaches 869 mAh/g, which is very close to the theoretical capacity of 937 mAh/g if the conversion reaction is assumed. The second discharge profile is different from the first. A single voltage plateau is observed around 0.6 V, which is a little bit higher than the first one. This may indicate that the reaction mechanism is different. It is worth noting that the second charge profile is very similar to the first charge profile, which presumably suggests that the electrochemical reaction becomes highly reversible after the first discharge cycle.

The embodiments provide an anode material which exhibits much better safety performance in comparison with other anode materials. The lithiation voltage of $Mn_3O_4$ manganese oxide (~0.6 V) is higher than that of typical graphitic carbon (below 0.2 V). This feature largely precludes lithium deposition. Thus, the embodiments could completely overcome safety problems since there is almost no possibility of depositing metallic lithium at such a high voltage. $Mn_3O_4$ manganese oxide also possesses lower operating voltages (peak potentials ~1.3 V on oxidation, 0.6 V on reduction) than $Co_3O_4$ (2.1 V on oxidation, 1.2 V on reduction). When combined with a specific cathode, the full cell operating voltage, and consequently the energy density of a resulting battery, will be higher.

Figure 5:
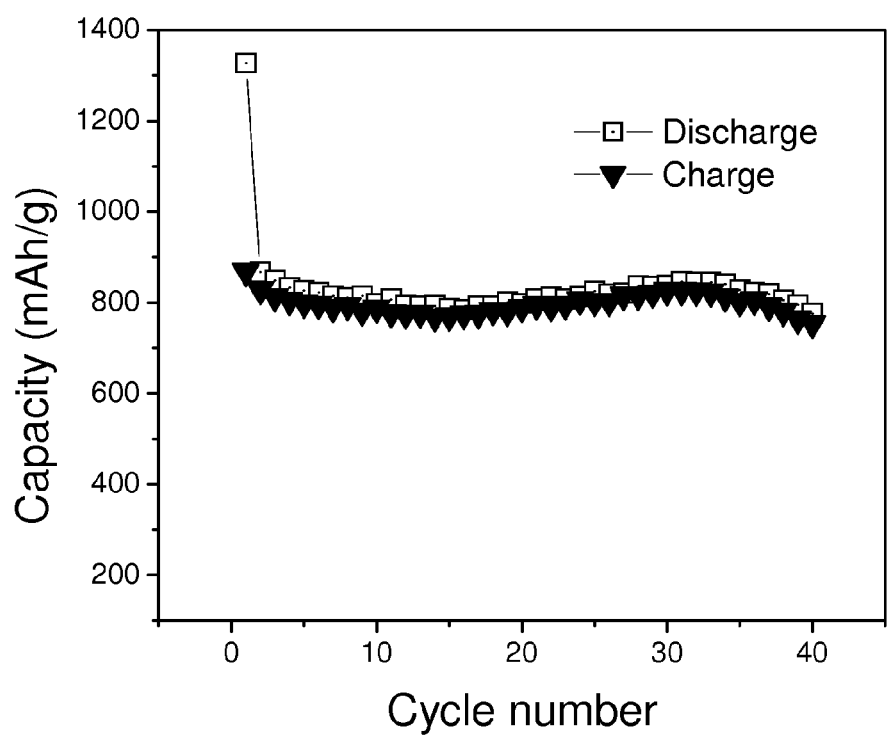
FIG. 5 shows a graph of trend of discharge/charge capacities of a $Mn_3O_4$/$LiPF_6$+EC+DEC/Li coin cell with cycle number at a current rate of 0.25 C.

The embodiments also provide $Mn_3O_4$ manganese oxide with very good cycle performance. The capacity versus cycle number for a $Mn_3O_4$ manganese oxide anode cycled over the range of 3.0 to 0.01 V for the first 40 cycles is shown in FIG. 5. It may be seen that the cycling is quite stable. The reversible capacity exhibits no significant fading after 40 cycles.

Figure 6:
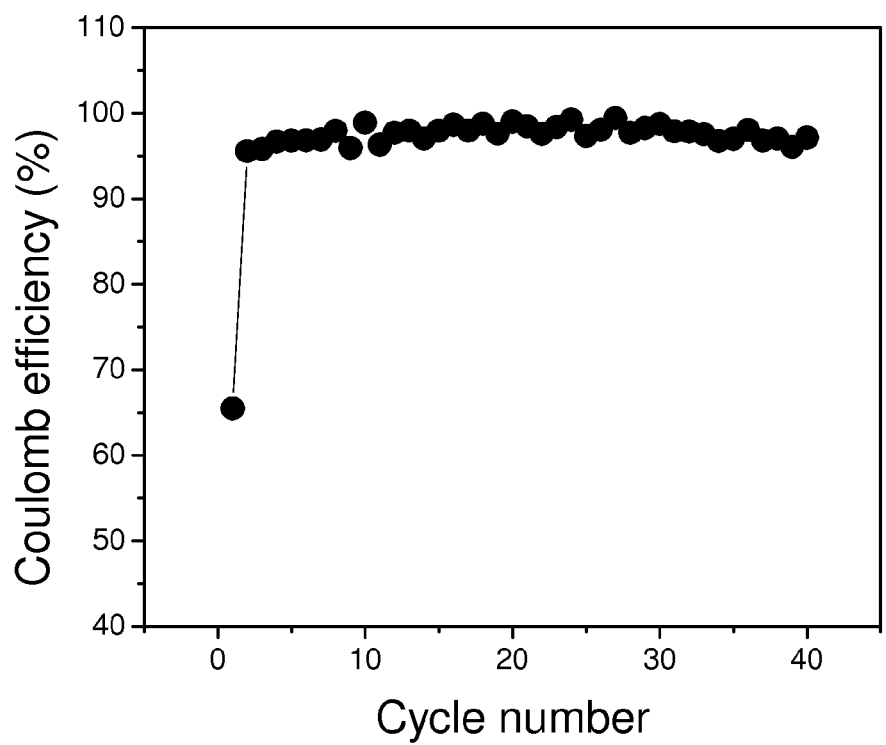
FIG. 6 shows a graph of trend of Coulomb efficiency of a $Mn_3O_4$/$LiPF_6$+EC+DEC/Li coin cell with cycle number at a current rate of 0.25 C.

The coulomb efficiency versus cycle number for the $Mn_3O_4$ manganese oxide anode cycled over the range 3.0 to 0.01 V for the first 40 cycles is shown in FIG. 6. The coulomb efficiency reaches more than 65% for the first cycle, which is much higher than previous reports on $Mn_3O_4$ manganese oxide anode materials. More importantly, it remains over 95% during the subsequent cycles.

Figure 7:
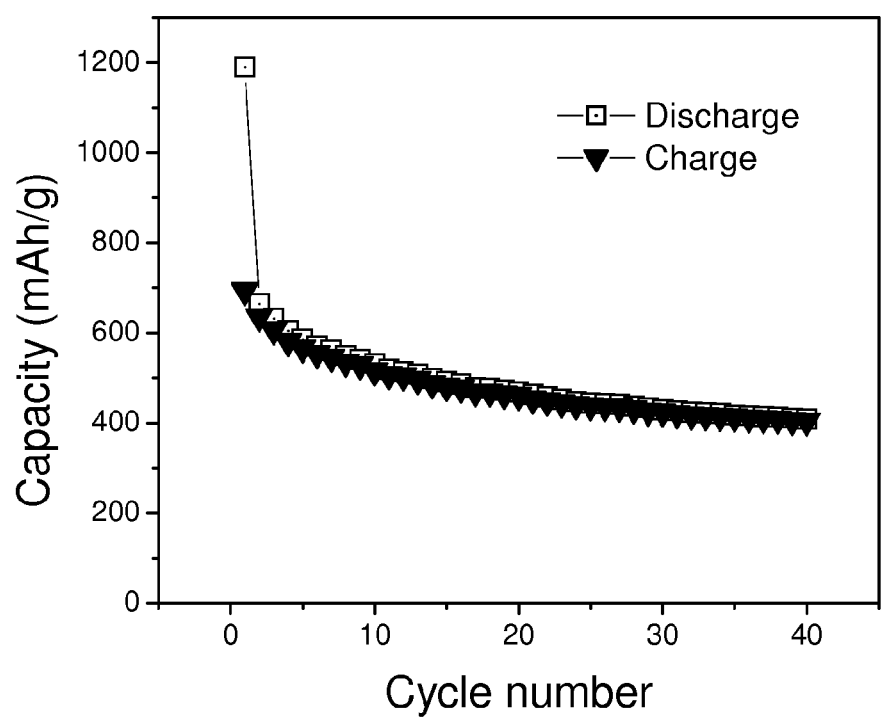
FIG. 7 shows a graph of trend of discharge/charge capacities of a $Mn_3O_4$/$LiPF_6$+EC+DEC/Li coin cell with cycle number at a current rate of 2.5 C.
Figure 8:
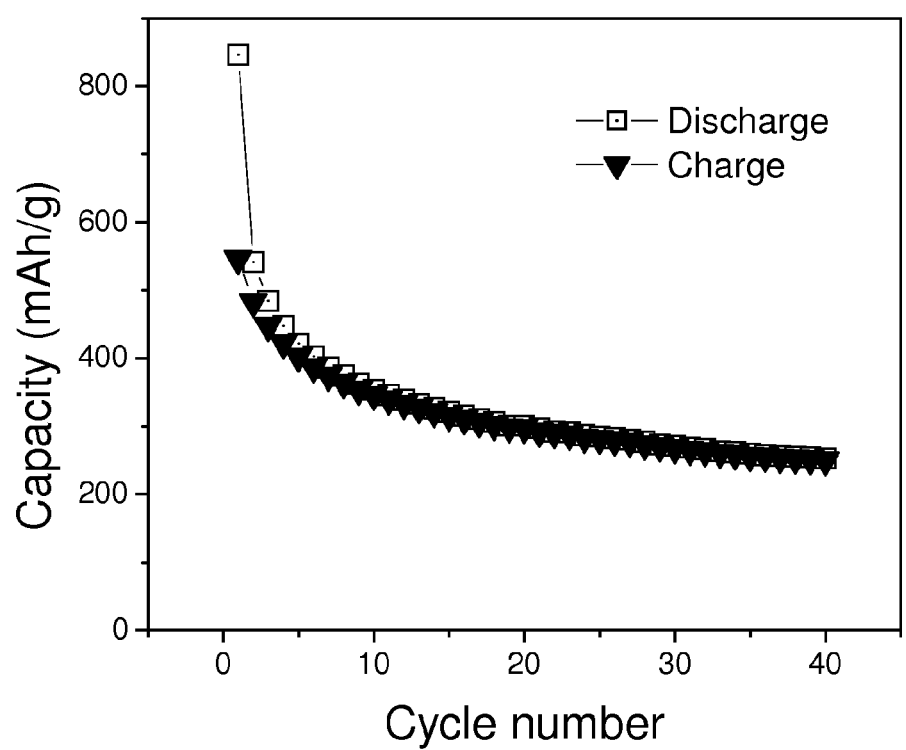
FIG. 8 shows a graph of trend of discharge/charge capacities of a $Mn_3O_4$/$LiPF_6$+EC+DEC/Li coin cell with cycle number at a current rate of 10 C.

The embodiments also provide a $Mn_3O_4$ manganese oxide anode with high power capability. The first reversible capacity of the $Mn_3O_4$ manganese oxide at a current rate of 2.5 C reaches about 700 mAh/g as shown in FIG. 7. This $Mn_3O_4$ manganese oxide anode can be cycled at 10 C with an acceptable initial capacity of around 550 mAh/g as can be seen in FIG. 8.

Figure 9:
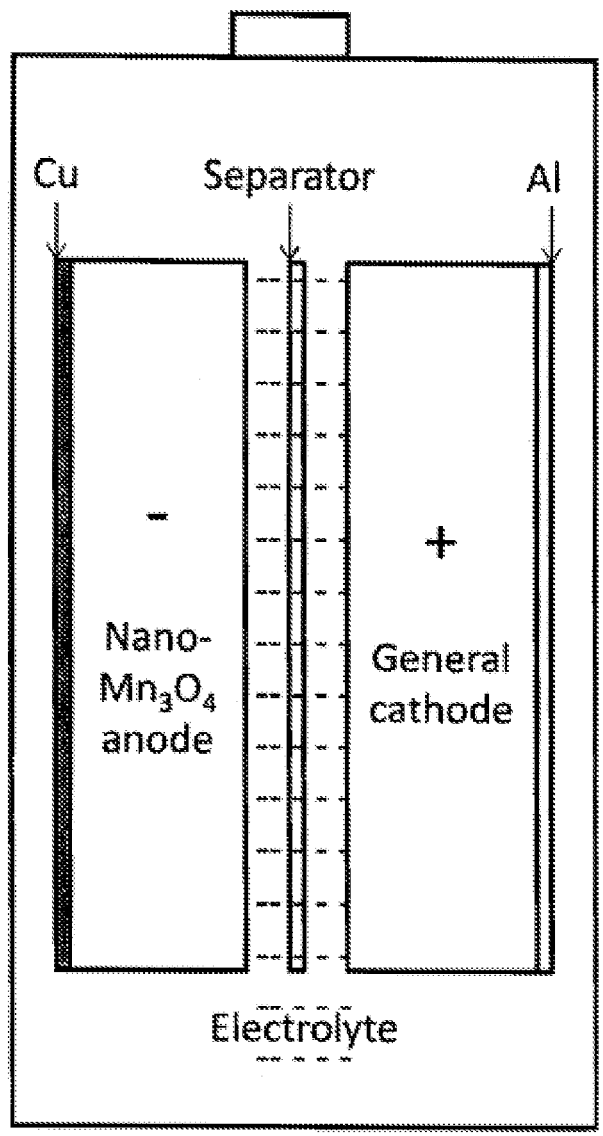
FIG. 9 shows a schematic diagram of an illustrative lithium battery in accordance with the embodiments.

For reference purposes, a schematic diagram of a lithium battery in accordance with the embodiments is illustrated in FIG. 9, where the general cathode is intended as a lithium cathode.

The outstanding electrochemical performance of this $Mn_3O_4$ manganese oxide anode could be attributed to its unique structural features and architecture. The nanoscale manganese oxide nanoparticles provide large surface area, which improves the utilization of active material. The open sponge structure allows lithium ions to transfer easily in and out. It is also able to accommodate the strain induced by possible volume changes during discharge-charge cycles and keep the integrity of the anode electrode. This may be responsible for the excellent cycling stability of a $Mn_3O_4$ manganese oxide anode in accordance with the embodiments.

The synthesis process of the $Mn_3O_4$ manganese oxide nanoparticle materials is also very simple with no need for expensive chemicals or special equipment. Manganese is much more environmentally benign, abundant and economically attractive than cobalt. The synthesis process and cell configuration can be easily optimized without departing from the spirit of the present embodiments. Better electrochemical performance could be anticipated with optimization. All of the above advantages as well as its high capacity, excellent cyclability and high charge/discharge rate capabilities suggest $Mn_3O_4$ manganese oxide nanoparticle materials as a very attractive candidate for anode materials for a next generation of rechargeable lithium batteries.

EXAMPLES

Example 1

This example illustrates the preparation of nanosized $Mn_3O_4$.manganese oxide.

Nanosized $Mn_3O_4$ manganese oxide was synthesized by a simple precipitation method. $Mn(OOCCH_3)_2.4H_2O$ was first dissolved in de-ionized water. The solution was heated to 100° C. in an oil bath. The stoichiometrically required amount of ammonium hydroxide was added to the solution, resulting in precipitation. The precipitate was centrifuged after ~4 h stirring, washed with de-ionized water, and dried at 80° C. overnight. The nanosized $Mn_3O_4$ was formed after heating the dried precipitates at 300° C. for 5 h. X-ray diffraction data, collected on a Rigaku Ultima IV X-Ray Diffractometer with Cu kα radiation, showed that the $Mn_3O_4$ was a single-phase material with a tetragonal spinel structure as seen in FIG. 2 The scanning electron microscopy images of the as-prepared $Mn_3O_4$ showed that the average size is about 80 nm as seen in FIG. 3.

Example 2

This example illustrates the fabrication of the $Mn_3O_4$ electrode.

The $Mn_3O_4$ electrode film was fabricated with 70 wt. % $Mn_3O_4$ as the active material, 20 wt. % Super P-Li (Timcal Ltd.) as a conductive carbon-based additive, and 10 wt. % poly(vinylidene difluoride) (PVDF) as a binder. N-methyl-2-pyrrolidone (NMP) was used as a solvent to make a slurry. The slurry was uniformly coated onto a copper foil with a doctor blade. It was cut into circular electrodes of 0.71 $cm^2$ area and dried overnight under vacuum at 100° C.

Example 3

This example illustrates the configuration of coin cells for use to measure the electrochemical performance of $Mn_3O_4$ electrode.

Electrochemical measurements were conducted with CR2032 coin cells. Coin cells were assembled in an argon-filled glovebox with lithium foil as the anode and the $Mn_3O_4$ from Example 2 as the cathode, Celgard 2320 as the separator, and a solution of 1.0 M $LiPF_6$ in EC/DEC (1:1 by volume) as the electrolyte. Galvanostatic discharge-charge tests were carried out on Maccor 4000 battery test system. The cells were cycled between 3.0 V-0.01 V at a current density of 0.25 C for both discharge and charge (1 C is defined as one lithium per formula in one hour, i.e. 117 mA/g for $Mn_3O_4$). The first and second discharge-charge curves are shown in FIG. 4, and the cycle performance is shown in FIG. 5. The coulomb efficiency with cycle number is shown in FIG. 6.

Example 4

This example shows the performance of $Mn_3O_4$ at high current rate.

The details are the same as Example 3 except that the current density is 2.5 C for both discharge and charge. The cycle performance is shown in FIG. 7.

Example 5

This example shows the performance of $Mn_3O_4$ at high current rate.

The details are the same as Example 3 except that the current density is 10 C for both discharge and charge. The cycle performance is shown in FIG. 8.

All references, including publications, patent applications, and patents cited herein are hereby incorporated by reference in their entireties to the same extent as if each reference was individually and specifically indicated to be incorporated by reference and were set forth in its entirety herein.

The use of the terms "a" and "an" and "the" and similar referents in the context of describing the embodiments or the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein is merely intended to serve as a shorthand method of referring individually to each separate value falling within the range, unless otherwise indicated herein, and each separate value is incorporated into the specification as if it was individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present embodiments without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A nanoparticle comprising a pure phase manganese oxide material that has a tetragonal spinel crystal structure.

2. The nanoparticle of claim 1 wherein:
the nanoparticle has a particle size from about 65 to about 95 nanometers;
the pure phase manganese oxide material has a chemical composition selected from the group consisting of $Mn_3O_4$, $Li_xMn_3O_4$ ($x \geq 0$) and $Mn_2O_3.MnO$ chemical compositions; and
the pure phase manganese oxide material has a sponge like morphology when imaged using a scanning electron microscopy method at a magnification of 2000.

3. The nanoparticle of claim 2 wherein:
the scanning electron microscopy method provides a scanning electron microscopy image in accordance with FIG. 3A; and
the pure phase is determined using an x-ray diffraction method that provides an x-ray diffraction spectrum in accordance with FIG. 2.

4. A battery component comprising a nanoparticle comprising a pure phase manganese oxide material that has a tetragonal spinel crystal structure.

5. The battery component of claim 4 wherein:
the nanoparticle has a particle size from about 65 to about 95 nanometers;
the pure phase manganese oxide material has a chemical composition selected from the group consisting of $Mn_3O_4$, $Li_xMn_3O_4$ ($x \geq 0$) and $Mn_2O_3.MnO$ chemical compositions; and
the pure phase manganese oxide material has a sponge like morphology when imaged using a scanning electron microscopy method at a magnification of 2000.

6. The battery component of claim 5 wherein:
the scanning electron microscopy method provides a scanning electron microscopy image in accordance with FIG. 3A; and
the pure phase is determined using an x-ray diffraction method that provides an x-ray diffraction spectrum in accordance with FIG. 2.

7. The battery component of claim 4 wherein the battery component does not include a reduced graphene oxide material.

8. The battery component of claim 4 wherein the battery component comprises an anode.

9. A battery comprising a battery component comprising a nanoparticle comprising a pure phase manganese oxide material that has a tetragonal spinel structure.

10. The battery of claim 9 wherein:
the nanoparticle has a particle size from about 65 to about 95 nanometers;
the pure phase manganese oxide material has a chemical composition selected from the group consisting of $Mn_3O_4$, $Li_xMn_3O_4$ ($x \geq 0$) and $Mn_2O_3.MnO$ and non-stoichiometric chemical compositions;
the pure phase manganese oxide material has a sponge like morphology when imaged using a scanning electron microscopy method at a magnification of 2000.

11. The battery of claim 10 wherein:
the scanning electron microscopy method provides a scanning electron microscopy image in accordance with FIG. 3A; and
the pure phase is determined using an x-ray diffraction method that provides an x-ray diffraction spectrum in accordance with FIG. 2.

12. The battery of claim 9 wherein the battery comprises a lithium battery.

13. The battery of claim 12 wherein the lithium battery comprises a lithium ion battery.

14. The battery of claim 9 wherein the battery does not include a reduced graphene oxide material.

15. A method for preparing a nanoparticle comprising calcining a manganese hydroxide material to form a pure phase manganese oxide material that has a tetragonal spinel crystal structure.

16. The method of claim 15 wherein the calcining uses a temperature from about 200 to about 400 degrees centigrade for a time period from about 1 to about 20 hours in an oxygen containing environment.

17. The method of claim 16 wherein the oxygen containing environment comprises an ambient air environment.

18. The method of claim 15 wherein the manganese oxide material comprises $Mn_3O_4$.

19. The method of claim 15 wherein:
the nanoparticle has a particle size from about 65 to about 95 nanometers;
the pure phase manganese oxide material has a chemical composition selected from the group consisting of $Mn_3O_4$, $Li_xMn_3O_4$ ($x \geq 0$) and $Mn_2O_3.MnO$ chemical compositions; and
the pure phase manganese oxide material has a sponge like morphology when imaged using a scanning electron microscopy method at a magnification of 2000.

20. The method of claim 19 wherein:
the scanning electron microscopy method provides a scanning electron microscopy image in accordance with FIG. 3A; and
the pure phase is determined using an x-ray diffraction method that provides an x-ray diffraction spectrum in accordance with FIG. 2.

21. The method of claim 15 wherein the manganese hydroxide material is formed by hydroxide treatment of a manganese salt containing solution.

22. A battery comprising a battery component comprising a nanoparticle comprising a pure phase manganese oxide material that has a tetragonal spinel structure, wherein the battery has:
an initial discharge capacity of about 1327 mAh/g at a current rate of 0.25 C;
a first charge capacity of about 869 mAh/g; and
a substantially constant capacity of about 800 mAh/g for cycles 2-40.

* * * * *

UNITED STATES PATENT AND TRADEMARK OFFICE
CERTIFICATE OF CORRECTION

PATENT NO. : 9,748,568 B2
APPLICATION NO. : 14/122346
DATED : August 29, 2017
INVENTOR(S) : Héctor D. Abruña et al.

It is certified that error appears in the above-identified patent and that said Letters Patent is hereby corrected as shown below:

In the Specification

Column 1, Line 16, delete "The investigations that lead to the embodiments described herein and the invention claimed herein were funded by the United States Department of Energy under project number DE-SC0001086. The United States Government has rights in the invention claimed herein." and insert --This invention was made with government support under DE-SC0001086 awarded by the Department of Energy. The government has certain rights in the invention.--

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*